United States Patent
Berger

(10) Patent No.: US 6,744,750 B1
(45) Date of Patent: Jun. 1, 2004

(54) REPLICATING AND RECOMBINANT NETWORKING SYSTEMS AND METHODS FOR WIRELESS NETWORKS

(75) Inventor: H. Stephen Berger, Georgetown, TX (US)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/407,478

(22) Filed: Sep. 28, 1999

(51) Int. Cl.[7] ............................ H04B 7/212; H04Q 7/00
(52) U.S. Cl. ....................... 370/337; 370/336; 370/332; 455/450; 455/524
(58) Field of Search ................................ 370/337, 336, 370/329, 332; 455/524

(56) References Cited

U.S. PATENT DOCUMENTS

| | | | |
|---|---|---|---|
| 5,995,500 A | 11/1999 | Ma et al. | 370/337 |
| 6,230,015 B1 | 5/2001 | Kinnunen et al. | 455/450 |

FOREIGN PATENT DOCUMENTS

| | | |
|---|---|---|
| DE | 19704907 A1 | 2/1997 |
| EP | 06090480 | 3/1994 |
| EP | 94201485.3 | 5/1994 |
| EP | 96850017.3 | 2/1996 |
| WO | WO/95/24655 | 9/1995 |
| WO | 0713300 A1 | 5/1996 |
| WO | WO/98706228 | 2/1998 |
| WO | WO/99/04514 | 1/1999 |

Primary Examiner—Nay Maung
Assistant Examiner—Alan T. Gantt

(57) ABSTRACT

Systems and methods allow for more efficient wireless networking. In one system, plural subscriber units form a direct network and transmit and receive without base station mediation. In another system, base stations are networked so that one base station can take advantage of the second, networked, base station. In one example, high-capacity lines are connected to one base station which is then networked to a second base station. Through the network, the second base station can utilize the high-capacity lines without being directly connected to them. In another example, the subscriber units can migrate between all base stations in the network. In another example, using networked base stations and unassigned time sequences or codes, calls can be dynamically reassigned between base stations to meet shifting demand.

22 Claims, 15 Drawing Sheets

BACKGROUND

BACKGROUND

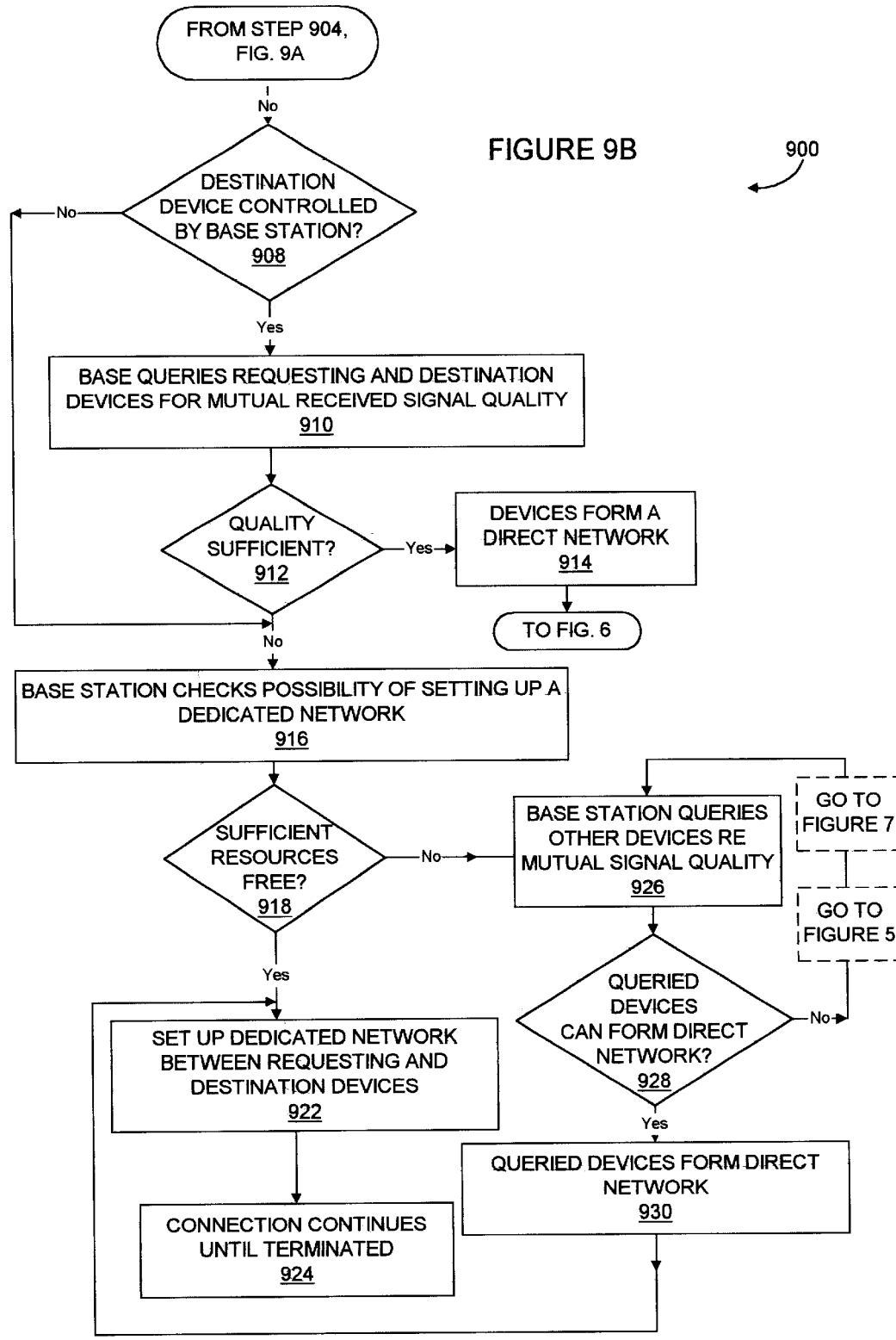

REPLICATING AND RECOMBINANT NETWORKING SYSTEMS AND METHODS FOR WIRELESS NETWORKS

FIELD OF THE INVENTION

This invention relates to wireless and cordless communications systems.

BACKGROUND OF THE INVENTION

Wireless communication systems have experienced phenomenal growth in recent years. Wireless systems offer users unprecedented convenience and efficiency in communication. As users proliferate, the available bandwidth for use becomes more precious. Multiple access systems are allowing more users to share the finite radio spectrum. In addition, new services are being introduced, many of which have high bandwidth demands. As demand increases, more efficient networks become necessary. Networks are also limited by switching capabilities. Since every call is routed through a base station and its switches, networks are limited by base station switching capacity. Also, since base stations can connect to wireline systems, capacity can be limited by the availability of lines. Furthermore, wireless systems are often more expensive than wired systems; the cost of services and equipment can be prohibitive. What is needed are more efficient, cost-effective systems for wireless communications.

SUMMARY OF THE INVENTION

New wireless networks are dynamically generated, reconfigured and recombined based on demand and signal quality. The base stations and/or subscriber units are programmed to recognize when system performance will be enhanced by generating, reconfiguring, or recombining networks. In one aspect of the invention, a base station has the capacity to send and/or receive on plural networks. Two base stations can share a dedicated network, allowing each station to use the other's capacity. Dedicated networks can be set up by human action or automatically by algorithms. In the dedicated-network embodiment, for example, if one base station has an open external line and the other base station has a call request it cannot support, the call request can be directed to the open line by way of the dedicated network. A first networked base station can be connected to high-capacity lines and other networked base stations not directly connected to those lines can access them through the first networked base station. In another alternative, subscriber units form direct networks, freeing up base station resources.

DESCRIPTION OF THE PREFERRED EMBODIMENTS

Figure 1:
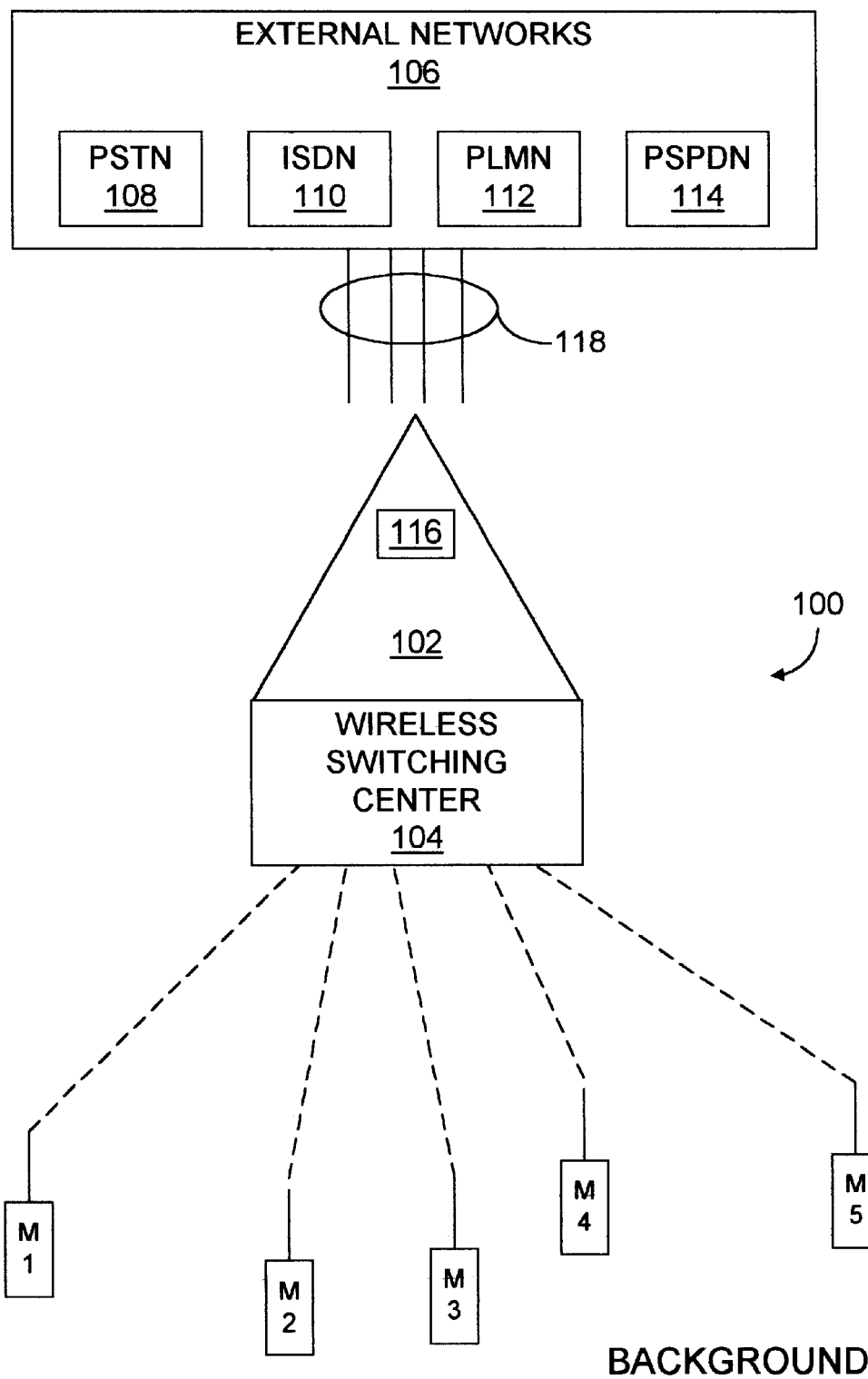
FIG. 1 is a depiction of a general wireless system.

A wireless system 100 as known in the background art is depicted in FIG. 1. The system has been simplified for clarity. To provide context for the invention, the operation of a typical system of the background art is described. In system 100, base station 102 is connected by wireline to a wireless switching center 104, which connects to external networks 106, including the public switched telephone network (PSTN) 108, integrated service digital network (ISDN) 110, the public land mobile network (PLMN) 112, and the public switched packet data network (PSPDN) 114.

Base station 102 handles subscriber units M1–M5. The base station includes a transceiver system and a base station controller. The base station controller exchanges messages with the transceiver system and with the wireless switching center. Wireless switching center 104 is depicted as included in the base station, but it could be remote and be connected wirelessly or by wireline. The wireless switching center interfaces calls from the base station 102 to the external networks and also interfaces with an operations system (for overall administration and maintenance of the wireless center) and an interworking function (to enable communication with other networks).

Base station 102 further includes mobility data bases and controllers. Data bases can include a home location register (HLR) that maintains subscriber information including directory number, subscriber identity, and electronic serial number; and a visited location register (VLR); the VLR dynamically lists users who have roamed into the network's area, coordinating information with the home location register. Controllers include authentication units and equipment registers. Although these data bases and controllers are included in the base station shown in FIG. 1, they can be remotely located so long as they communicate with the base station.

Base station 102 includes a processor 116. Base station 102 is connected to external networks 106 by links 118. Links 118 can be high-capacity lines such as fiber optics or coaxial cables, twisted wire, twin axial cable, satellite or microwave transmission, or other appropriate link. Base station 102 transmits and receives wireless signals. Typically, the signals are radio transmissions. In alternatives, transmission can use other wireless frequency ranges, such as microwave or infrared.

Subscriber units M1–M5 are wireless devices, as for example cordless telephones, personal communications devices, pagers, or cellular telephones. Subscriber units M1–M5 are intelligent devices; each includes a transmitter, a receiver, and a processor. Subscriber units have the ability to perform tasks including power-up and initialization; scanning channels (e.g., control channels); determining system characteristics; initiating and responding to orders, such as call hold, conference calls, caller ID, and three-way calling;

idling; registration and deregistration so the HLR and VLR can update their data bases; handoff; and call clearing.

As a subscriber-unit user moves around and gets closer to a new base station, the new base station senses the proximity. The new base station then signals the old base station and requests control of the call. In this way, calls are handed off between base stations without the user being aware that it is happening.

The area covered by different base stations can be divided up into cells. Neighboring cells are assigned different frequency ranges; frequencies can be reused further away without interference between calls, allowing more users to be served. Frequency division, time division and code division can allow more mobile users to share a finite radio spectrum. Spread spectrum multiple access techniques also increase the number of users and add levels of security to transmission.

Consider an outgoing call dialed by the user of subscriber unit M1 in FIG. 1. Because M1 is currently controlled by base station 102, the call initiation request goes to base station 102. Along with the call initiation request, M1 transmits its identification number, electronic serial number, and station class mark (which gives information about its system characteristics, such as maximum transmitter power). Base station 102 transmits an application protocol qualification request to the VLR, which then returns a response to the qualification request. The base station then processes an ISDN Setup message and transmits it to the wireless switch (not shown in FIG. 1). The wireless switch then sends an initial address message to the switch at the destination, wireless or wireline.

Meanwhile, the wireless switch sends a Call Proceeding message to the base station The base station assigns a traffic channel to subscriber unit M1. M1 tunes to the traffic channel and confirms the assignment.

The destination switch determines the status of the destination phone and returns an Address Complete Message to the wireless switch The wireless switch sends an ISDN alert message to the base station in response to the ISDN Setup message. The wireless switch provides a ringing signal to M1, to let the user know the destination phone is ringing.

When the called party answers, the destination switch sends an answer message to the wireless switch. The wireless switch sends an ISDN Connect message to the base station, removes the audible ringing, and makes the connection. The base station sends a Connect Acknowledge message—and the two parties establish communication.

Figure 2:
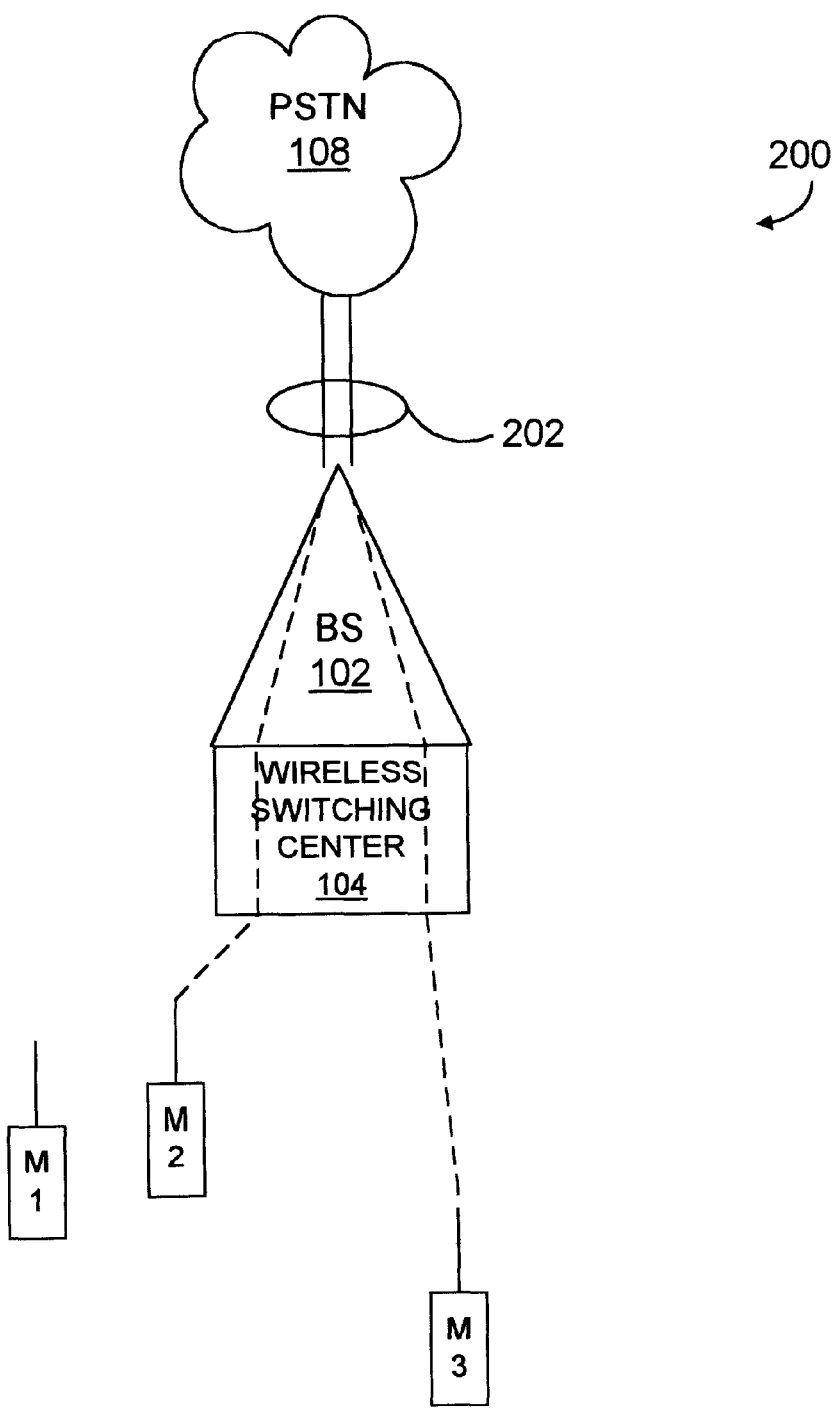
FIG. 2 is a second depiction of a general wireless system.

Communication cannot be established if the base station or wireless switch has no available capacity. A simplified example is shown in FIG. 2. As shown in FIG. 2, base station 102 has two outgoing lines 202. If M2 and M3 are already using the outgoing lines, M1 will not be able to connect out. Similarly, if an outside party dials M1 while M2 and M3 are using lines 202, the call will not come in.

Figure 3:
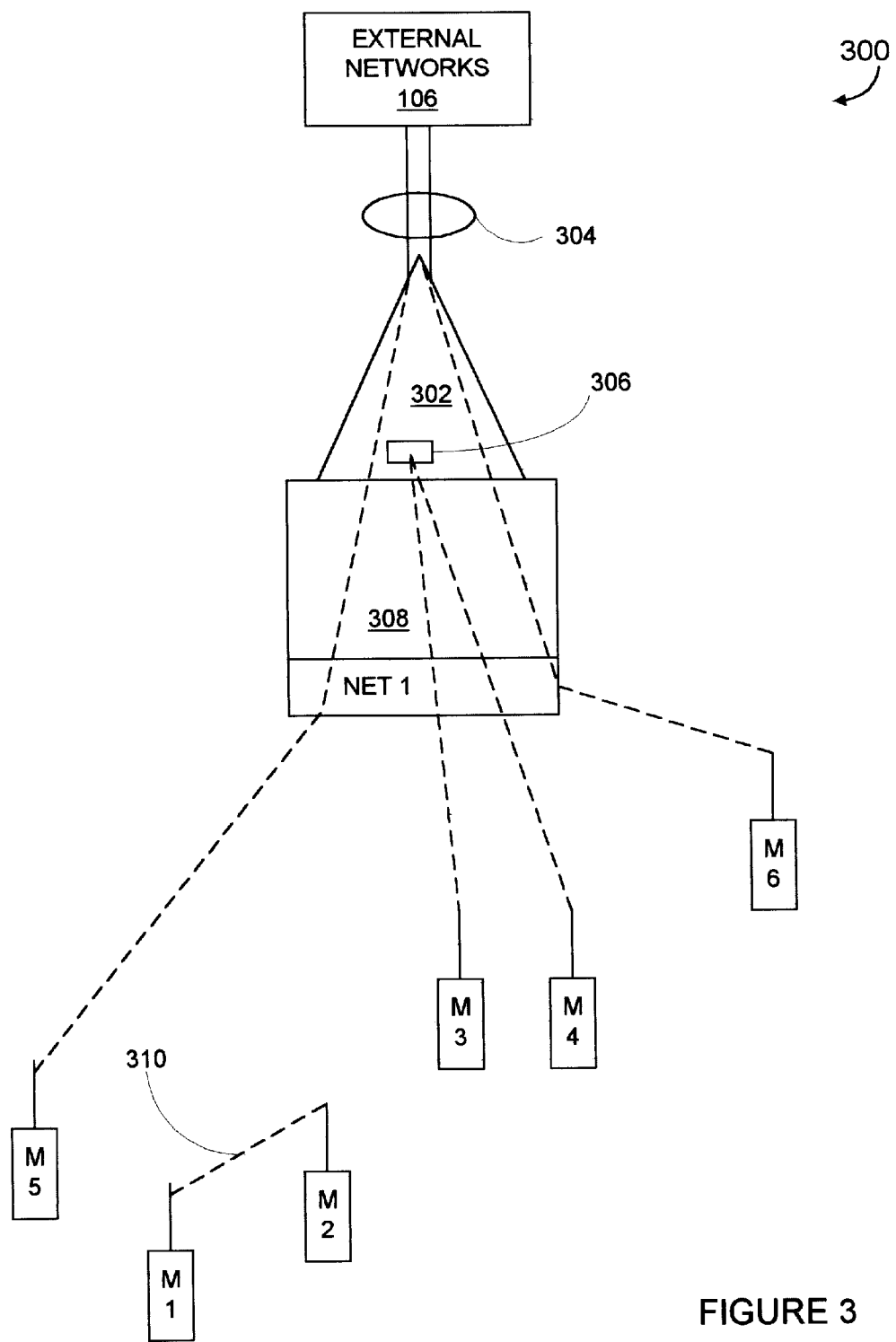
FIG. 3 is a depiction of a system in accordance with the present invention.

A system 300 in accordance with the present invention is shown in FIG. 3. A base station 302 connects via lines 304 to external networks 106. In addition to components included in (or accessible to) the base station as discussed with reference to the system of the background art, base station 302 includes an internal switch 306, which can connect two subscriber units M3 and M4 without using the external networks, and a bandwidth resource distributor 308, which allocates channels. Base station 302 can also enable subscriber units M1 and M2 to communicate directly in a network 310, as depicted in FIG. 3. For example, base station 302 proposes a channel pair. (A channel pair is any logical allocation which allows for full-duplex communication. A channel pair can be a set of frequency allocations which is fixed or changing with time; it can also be a time slot allocation, or a sequencing or coding allocation.) M1 and M2 send signals using that channel pair to check whether signal strength is sufficient. One or both then notifies the base station whether the signal strength is sufficient.

If the signal strength is sufficient, M1 and M2 communicate directly on the channel pair. The communication is not mediated by the base station, but the base station is notified when signal strength falls below an acceptable level or is terminated. Subscriber units M5 and M6 are depicted using lines 304 to make calls to telephones connected to external networks 106.

The direct communication capability illustrated with M1 and M2 above m ay be implemented to retain residual functionality normally provided at the base station. As one example, if the base station loses power or otherwise becomes inoperable, the handset programming can be arranged to allow communication between handsets. Or, for example, M1 can attempt an internal call to M2. It cannot locate the base station but has adequate functionality to communicate with M2. It then generates a direct connection and the call is established.

Moreover, consider a situation in which M2 is beyond the transmission distance to the base station but within the transmission distance of the desired handset M1. In this case, either M1 or M2 can establish a direct connection and the call can proceed. M1, which can communicate with the base station, reports to the base station as part of the establishment of this call that it and M2 are in a direct network; the base station logs them as busy until notified otherwise. This mechanism effectively extends the transmission distance of the system.

Figure 4:
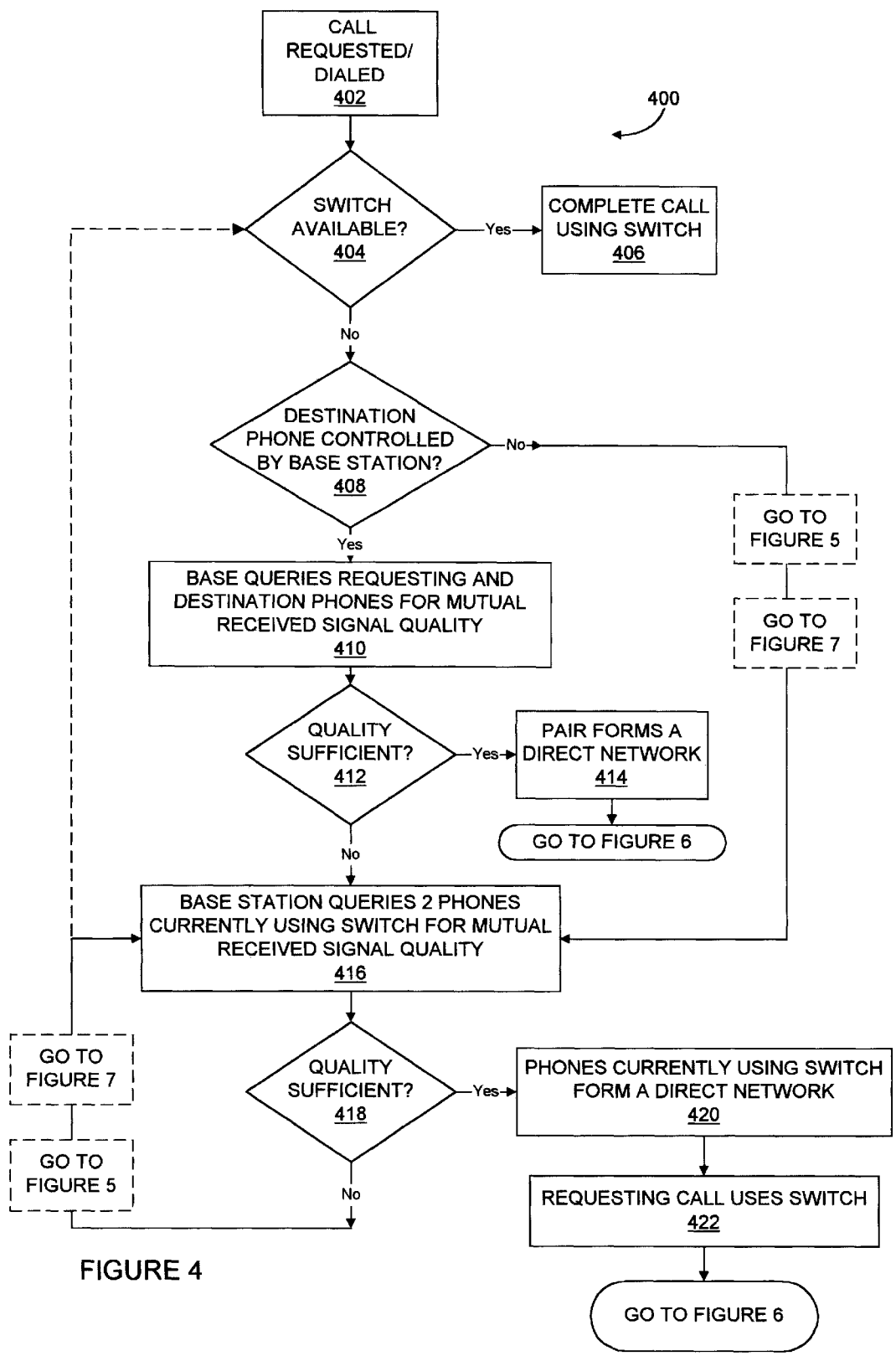
FIG. 4 is a flow chart of a method of the invention.

A method 400 in accordance with the present invention is shown in FIG. 4. At a step 402, a call is requested. The request can be by the subscriber unit sending an Initiation Request to the base station. At a step 404, the method checks whether a required connection resource (in the example given, a switch) is available. If the resource is available, the call is completed using it, at step 406. Besides switches and outside lines, base station resources can include bandwidth.

Figure 6:
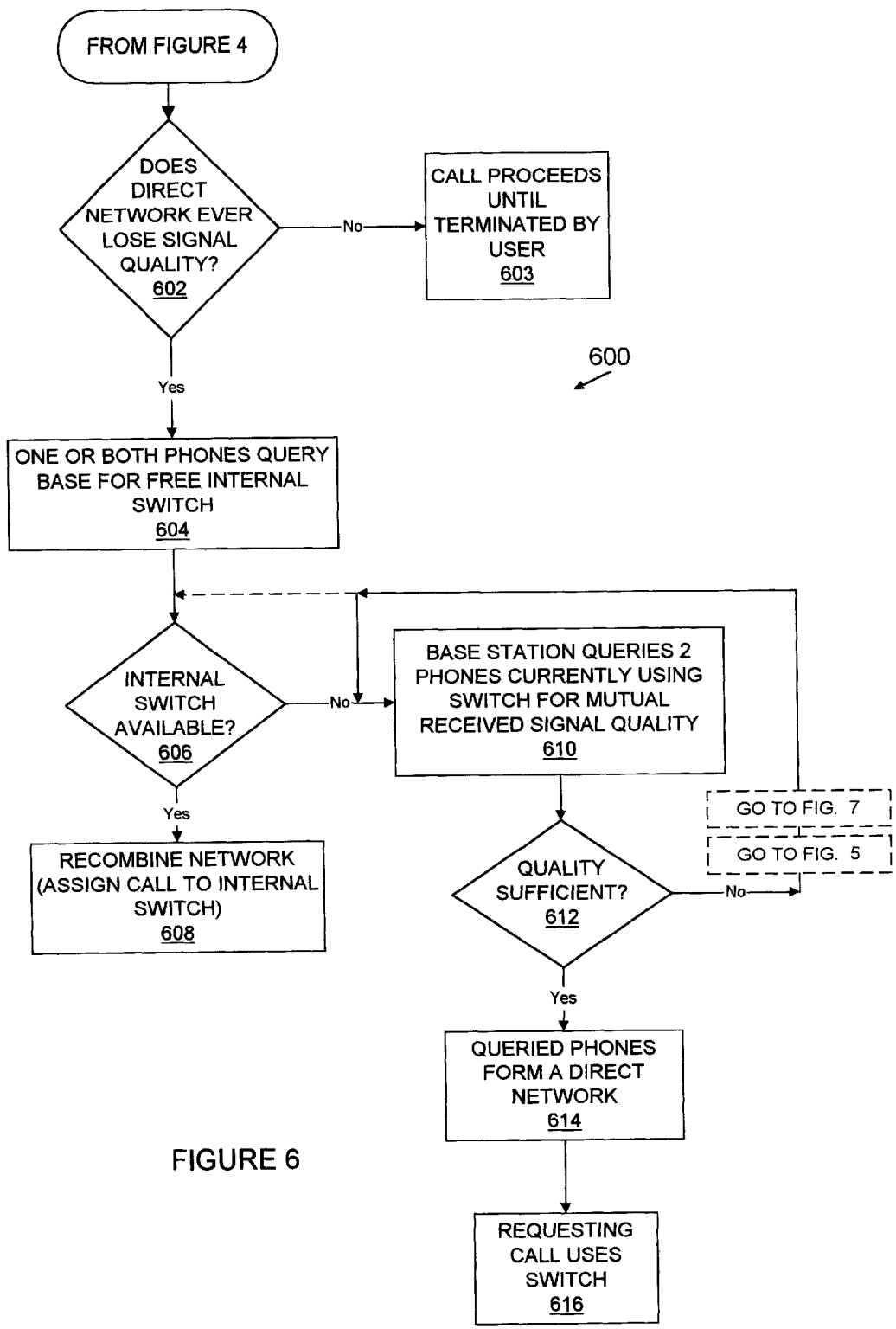
FIG. 6 is a flow chart of another method of the invention.

If the resource is not available, the method proceeds to a step 408, in which the method checks whether the destination phone is currently controlled by the base station. (The base station knows the location of the requesting unit.) This can be done by checking the HLR and VLR data bases. If yes, the base station finds an unused channel pair, and the method proceeds to a step 410, in which the base station queries the requesting and destination subscriber units to check the quality of a potential mutual signal at the channel pair. Subscriber units have the ability to scan channels and determine signal strength. If the signal quality exceeds a threshold, at a step 412, the requesting and destination subscriber units form a direct network, at a step 414. Signal quality is monitored, as shown in FIG. 6, which will be discussed later.

Figure 5:
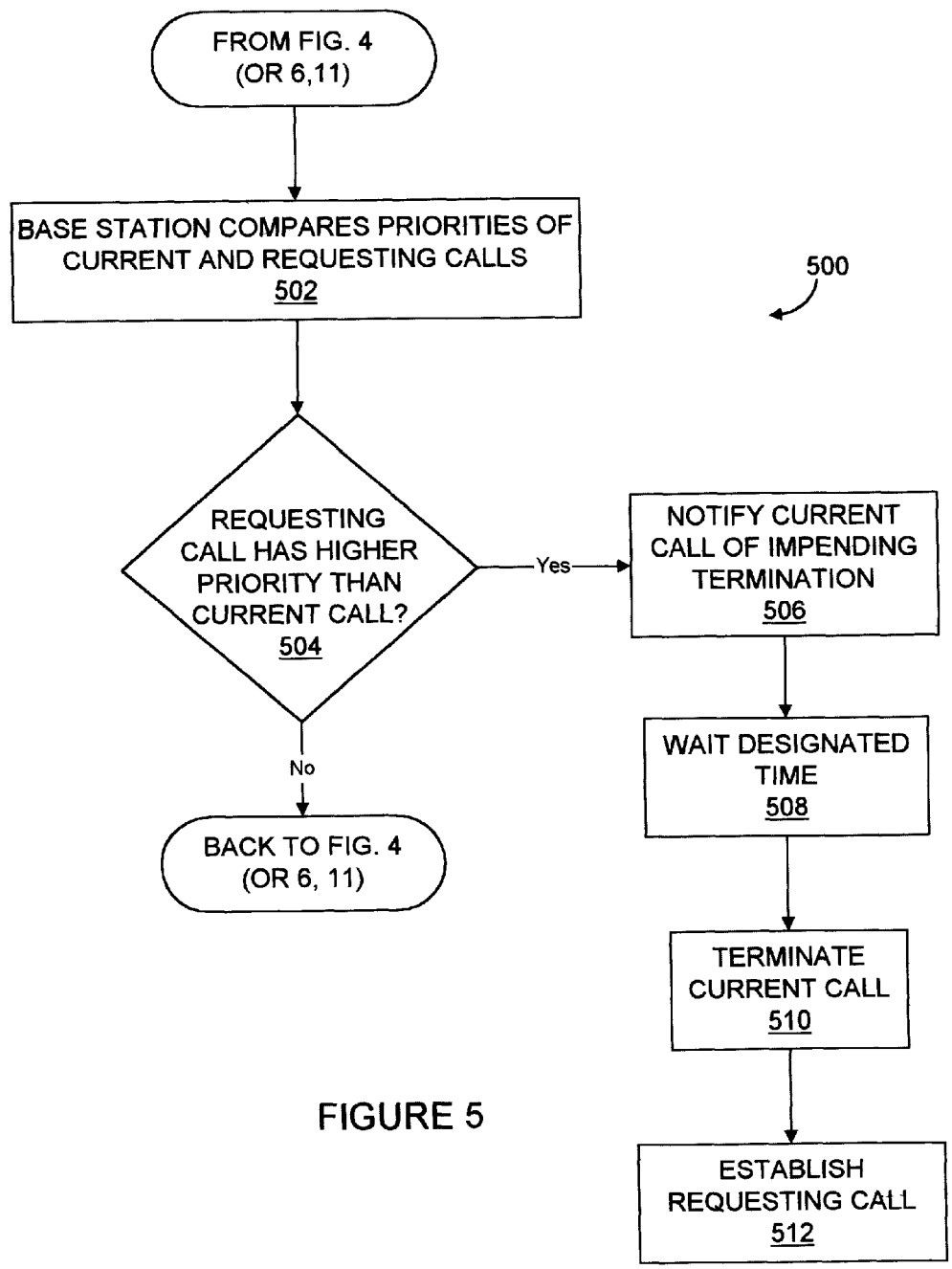
FIG. 5 is a flow chart of a call prioritization method used in accordance with the present invention.
Figure 7:
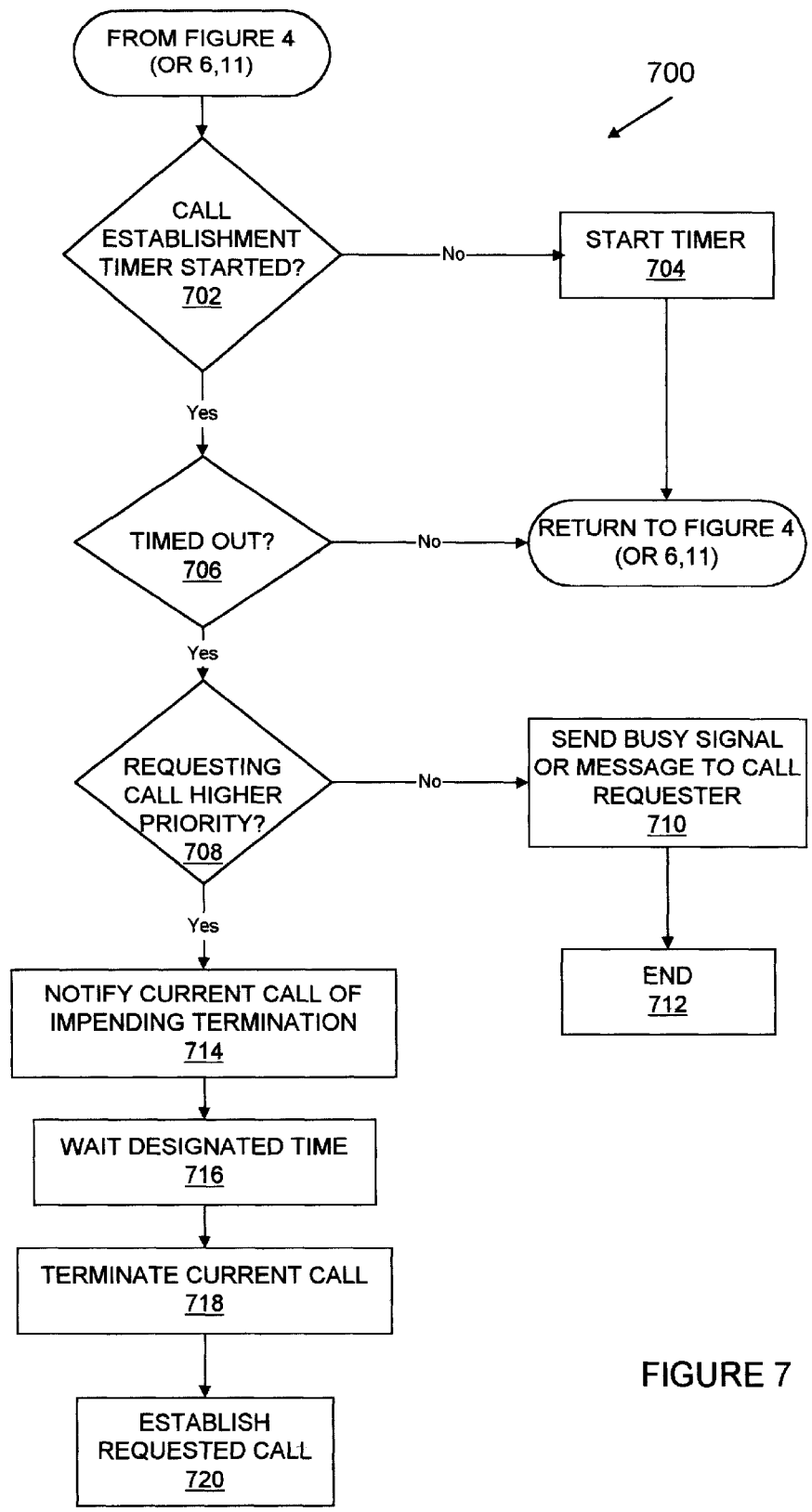
FIG. 7 is a flow chart of a timing method used in accordance with the present invention.

If the quality is not adequate, the method proceeds to step 416. Also, if the response to step 408 was no (the destination phone was not controlled by the base station), the method proceeds from step 408 to step 416. (In alternatives, after a "no" response to step 408, the method can proceed to FIG. 7, as indicated by the dashed box; or, the call request can be denied.) At step 416, the base station queries two subscriber units currently using a switch of the base station, to check the quality of a potential mutual signal If the quality exceeds a threshold, at a step 418, the queried phones currently using the switch form a direct network, at a step 420, and the requesting and destination telephones use the switch, at a step 422. If the quality is not adequate, the method loops back to step 416. In this way, the method can continue interrogation of current calls until a call whose handsets are capable of forming a direct network is found. In alternatives, the method can loop back to step 404 to check whether a switch has become available; call priorities can be compared (FIG. 5); a busy signal can be transmitted, or can be transmitted after a predetermined time-out or a predetermined number of iterations of any loop (FIG. 7).

In the foregoing embodiment, switches were used as examples of call resources. However, the invention can be applied to allocating other kinds of resources, e.g., outside lines, or bandwidth allocation among different frequencies or time slots. The "lines" might comprise fiber optics, copper, coaxial, or microwave links.

Methods can handle both internal and external call requests. For example, with an internal call request, the resource checked at step 404 would be an internal switch.

As mentioned, the method also allows for prioritization of calls. After a "no" response in step 418, the method can proceed as shown to a method 500 in FIG. 5. The base compares the priorities of the current call and the requesting call, at a step 502. At a step 504, if the requesting call does not have higher priority, the method returns to FIG. 4.

If at step 504, the requesting call has higher priority than the current call, the method notifies the current call of impending termination, at a step 506. A timer clocks a preselected time, at a step 508. The current call is then terminated at a step 510. At a step 512, the requesting call is established.

The subscriber units continue to monitor the signal quality of their direct communication with each other. If the connection loses signal quality (drops below a preselected threshold), the system switches the call. In a method 600 illustrated in FIG. 6, a "Yes" at a step 602 indicates that the direct network between the subscriber units loses signal quality. At a step 604, one or both phones query the base station for a free internal switch If a switch is available ("Yes" at a step 606), the call is brought back into the ordinary network and is reassigned to the internal switch, at a step 608.

If no switch is available, the base station queries two phones currently using the internal switch for potential mutual signal quality, at a step 610. If the quality exceeds a threshold, at a step 612, the phones currently using the switch form a direct network, at a step 614. The requesting call (the one using the direct network whose signal quality has fallen) is then reassigned to the switch, at a step 616. If, at step 612, the quality is not adequate, the method loops back to step 610. Alternatively, the method can return to step 606 or go to FIG. 5 or FIG. 7.

Signal quality can be defined as minimum usable signal for acceptable voice quality or data integrity. To ensure handoffs can be completed before a fading signal is lost, a switching margin is also preferably set, which can be defined as $\Delta = P_{handoff} - P_{minimum\ usable}$, where P is signal level $P_{handoff}$ is the handoff or switching level, and $P_{minimum\ usable}$ is the minimum acceptable signal level. The switching margin must be carefully chosen so as to avoid losing calls due to weak signal quality (if the $\Delta$ is too small), or switching too frequently (if the $\Delta$ is too large).

A call establishment timer or attempt counter can limit the time spent looking for an available switch and/or a subscriber unit pair to form a direct network so as to free up a switch. (A call establishment timer ensures that excessive time is not spent in an attempt to establish a call; if a call is not established within the set time, alternative steps are taken.)

As illustrated in FIG. 7, a method 700 (which can be invoked from FIG. 4, 6, or 11) begins by determining whether a call establishment timer has been started, at a step 702. If not, the time is started, at a step 704, and the method returns to FIG. 4 (or FIG. 6 or 11).

If the response to decision box 702 is "yes" (the timer has been started), the method proceeds to a step 706, where it is determined whether the timer has timed out. If the timer has not timed out, the method returns, to FIG. 4 (or FIG. 6 or 11). If the timer has timed out, it is determined whether the requesting call is of higher priority than the current call, at a step 708. If the requesting call is not of higher priority, the base station sends a busy signal or message to the call requester indicating that the call cannot be completed at present, at a step 710. The method then ends, at a step 712.

If the requesting call has a higher priority, the method proceeds to a step 714, at which the lower priority current call is notified of impending termination. A designated time is waited, at step 716; the lower priority call is terminated, at step 718; and the requested call is established, at step 720.

FIG. 7 illustrates a call establishment timer. An attempt counter can be used instead. An attempt counter works similarly, but limits the number of attempts rather than the time spent.

In establishing the connection, some of the initialization steps outlined above in the context of background art in FIG. 1, such as sending SETUP, Initial Address, Address Complete, and Answer messages can be performed by the two subscriber units, without requiring base station intervention.

Figure 8:
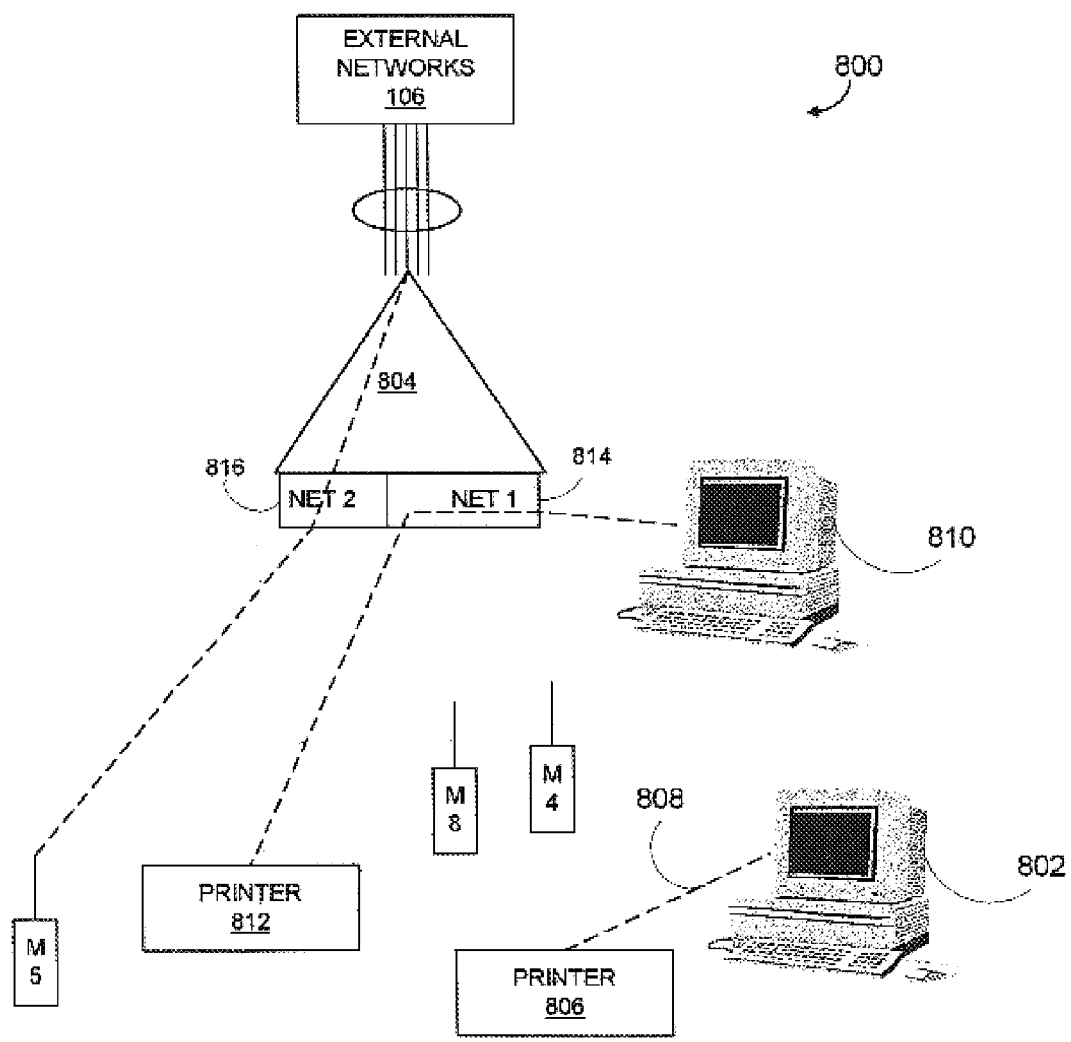
FIG. 8 is a depiction of a system in accordance with the present invention, using a computer and a peripheral device.

The devices need not be subscriber units such as telephones, but can be other electronic devices such as facsimile devices, computers, and computer peripheral devices such as printers. For example, a system 800 as illustrated in FIG. 8 includes a computer 802 or other data service device that contacts a base station 804 with a large data high bandwidth demand request. The data can be transmitted to a second local computer or a peripheral such as a printer 806. If the requesting device and target device report sufficient signal quality, a direct network is ordered by the base station, indicated by dashed line 808. Thus the full bandwidth of the direct network is available for the data transmission. Alternatively, suppose a computer 810 has a requested transmission to a printer 812 but the signal quality is not sufficient to allow a direct connection. The base station might create a dedicated network 814 with the two devices and act as the intermediary in the transmission. The dedicated network allows high bandwidth to the data transmission while other devices communicate unimpeded on other networks (for example net 816) of the base station. Although all devices in FIG. 8 are under the control of base station 804, the base station's resources can be used to achieve connections with other devices, including devices controlled by other base stations networked to base station 804, and through external connections, to any device accessible by internal or external networks, such as the PSTN.

Figure 9A:
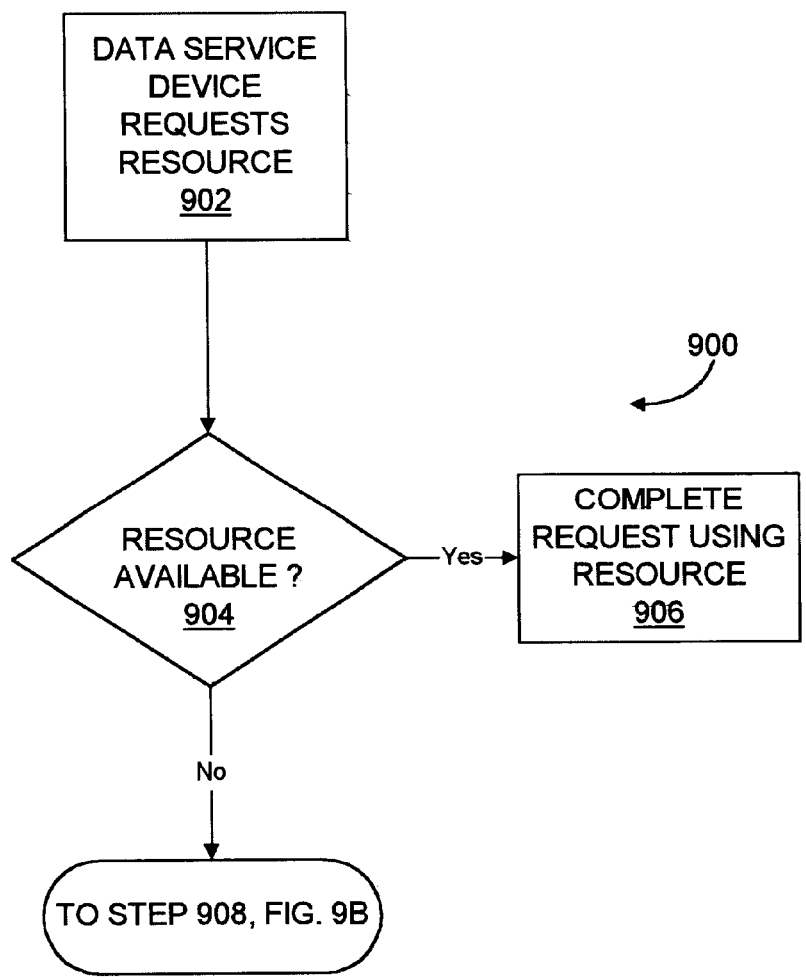
FIGS. 9A and B are flow charts of a method of the invention, using a data service device and a peripheral device.

A method 900 in accordance with the invention is illustrated in FIGS. 9A and 9B. In a step 902, a data service device (such as a computer or facsimile device) requests a connection (or other base station resource) from a base station, as shown in FIG. 9A. At a step 904, the method checks whether a required connection resource (e.g, a switch, an outside line, a time slot) is available. If the resource is available, the call is completed using it, at step 906. If the resource is not available, at a step 908, the base station determines whether the destination device is controlled by the base station. If yes, the base station queries the requesting and destination devices for mutual received signal quality, at a step 910. If the signal quality exceeds a threshold, at a step 912, the requesting and destination devices form a direct network, at a step 914. The method then proceeds to FIG. 6.

If, at step 912, the signal does not exceed the threshold, the base station checks the possibility of setting up a dedicated network at a step 916. If available resources are sufficient for the dedicated network, at a step 918, the dedicated network is set up, at a step 922, and the connection continues until terminated, at a step 924. The available resources can be obtained through networked base stations.

If there are not sufficient available resources for the dedicated network, either at the controlling base station or through networked base stations, the base station queries two subscriber units or other devices currently using resources of the base station, at a step 926, to check the quality of a potential mutual signal. If the quality exceeds a threshold, at a step 928, the queried devices form a direct network, at a step 930, and a dedicated network is set up for the requesting and destination devices (step 922). If the quality is not adequate, the method loops back to step 926. Call prioritization (as depicted, for example, in FIG. 5) and/or a call establishment timer (as depicted, for example, in FIG. 7) can optionally be used. The optional steps are indicated by dashed-line boxes. In this way, the method can continue interrogation of current connections until a connection is found whose devices are capable of forming a direct network.

If it is determined, at step 908, that the destination device is not controlled by the base station, the method skips steps 910, 912, and 914, and proceeds directly to check, at a step 916, the possibility of setting up a dedicated network between two devices that the base station does control, thereby freeing up resources that can be used by the requesting and destination devices. The method then proceeds as described above.

Figure 10:
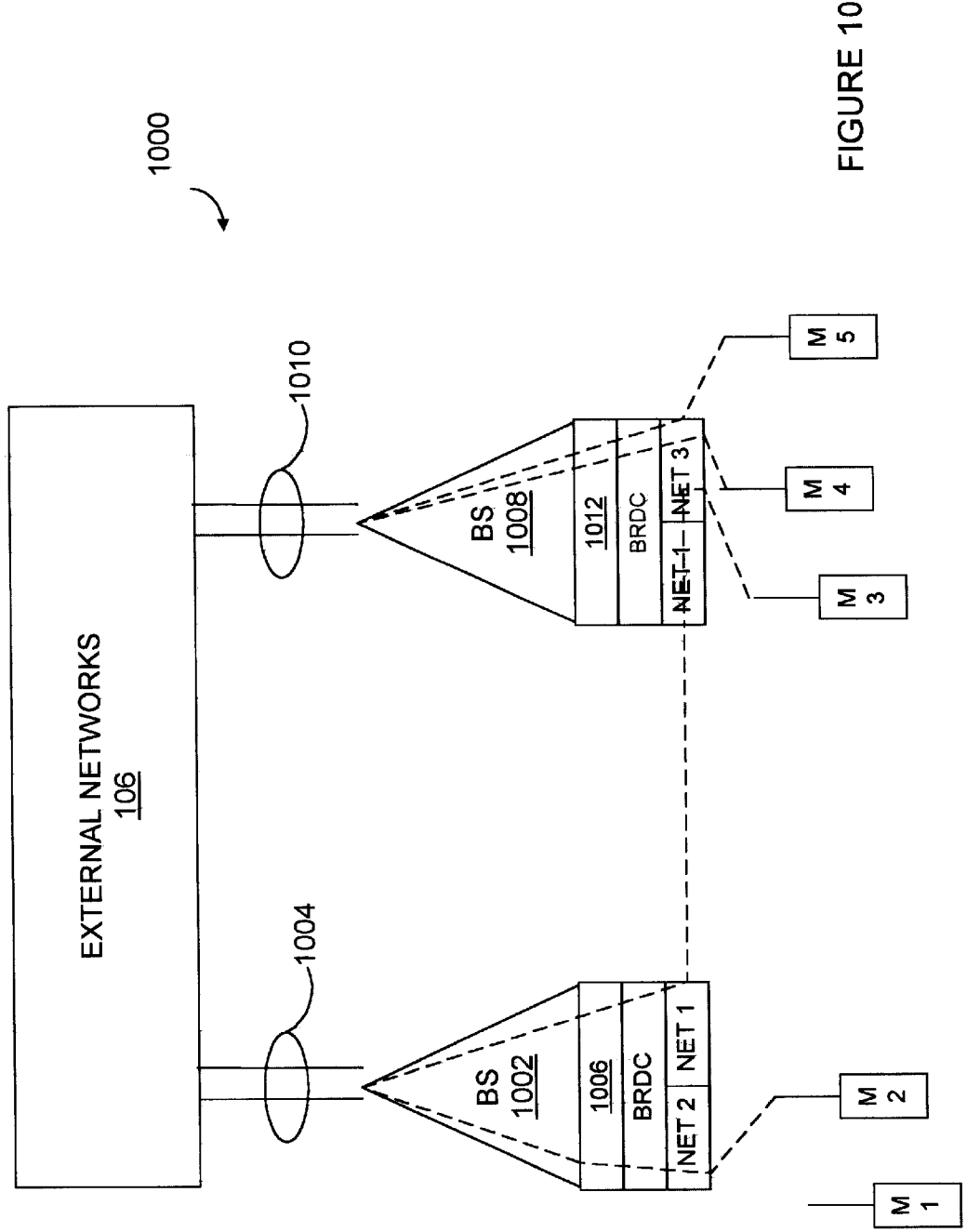
FIG. 10 is a depiction of two base stations connected by a dedicated network.

In another aspect of the present invention, a base station uses a dedicated network to share capability with another base station, as illustrated in FIG. 10. System 1000, simplified for illustration, includes a base station 1002 that has two external lines 1004 and one switch 1006, and a base station 1008 that has two external lines 1010 and one switch 1012. Base station 1002 handles subscriber units M1 and M2, and base station 1008 handles subscriber units M3, M4, and M5. Base station 1002 and base station 1008 have formed a dedicated network, Net 1. Base station 1002 uses its second network, Net 2, to handle its subscriber units, and base station 1008 uses its second network, Net 3, to handle its subscriber units.

In the example illustrated, M1 is not in use. M2 is connected to the PSTN via Net 2 of base station 1002. M4 and M5 are connected to the PSTN via Net 3 of base station 1008. M3 initiates a call.

Because its two lines are occupied by M4 and M5, base station 1008 does not currently have the capability to process the call. Using the dedicated network maintained with base station 1002, base station 1008 queries base station 1002 to see if it has an available line. If it does, M3's call proceeds through base station 1002; the signal goes from M3 to base station 1008; is retransmitted to base station 1002, and then the call is placed. If base station 1002 does not have an available line, base station 1008 can query any other networked base station.

Figure 11:
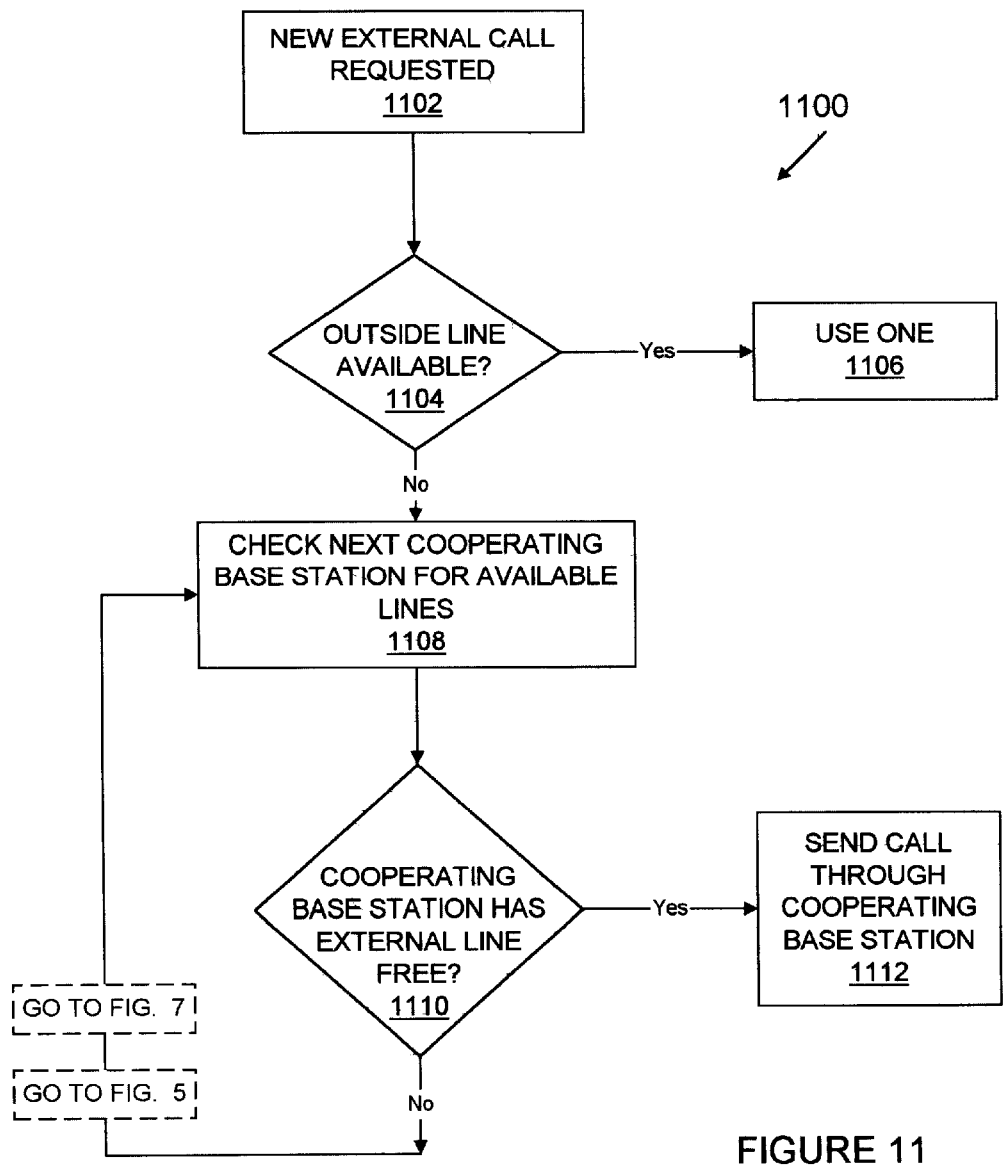
FIG. 11 is a flow chart of a method used in accordance with the present invention.

A method 1100 in accordance with the system of FIG. 10 is shown in FIG. 11. At a step 1102, an external call is initiated. (This step can be broken down into substeps in which the location of the destination phone is checked by reference to databases.) At a step 1104, the method checks whether an outside line is available. If an outside line is available, it is used, at a step 1106.

If an outside line is not available, the method proceeds to step 1108, which checks the next cooperating base station for available lines. If the cooperating base station has a line free, at a step 1110, the call is sent through the cooperating base station, at a step 1112. If the cooperating base station does not have an external line free, the method loops back to step 1108, and the next cooperating base station is checked for available lines. The next base station can be checked directly, if the first base station is networked to it, or alternatively, the second base station can check a base station with which it is networked. The loop in the method can be terminated by a time-out, as indicated by the optional step of going to FIG. 7.

The method of forming a network and the method of using a dedicated network can be combined. For instance, in the example in FIGS. 10 and 11, if four calls were simultaneously requested at base station 1002, it can route a first call through base station 1008, handle the second by forming a direct network between two subscriber units, and put two through on lines 1004.

Figure 12:
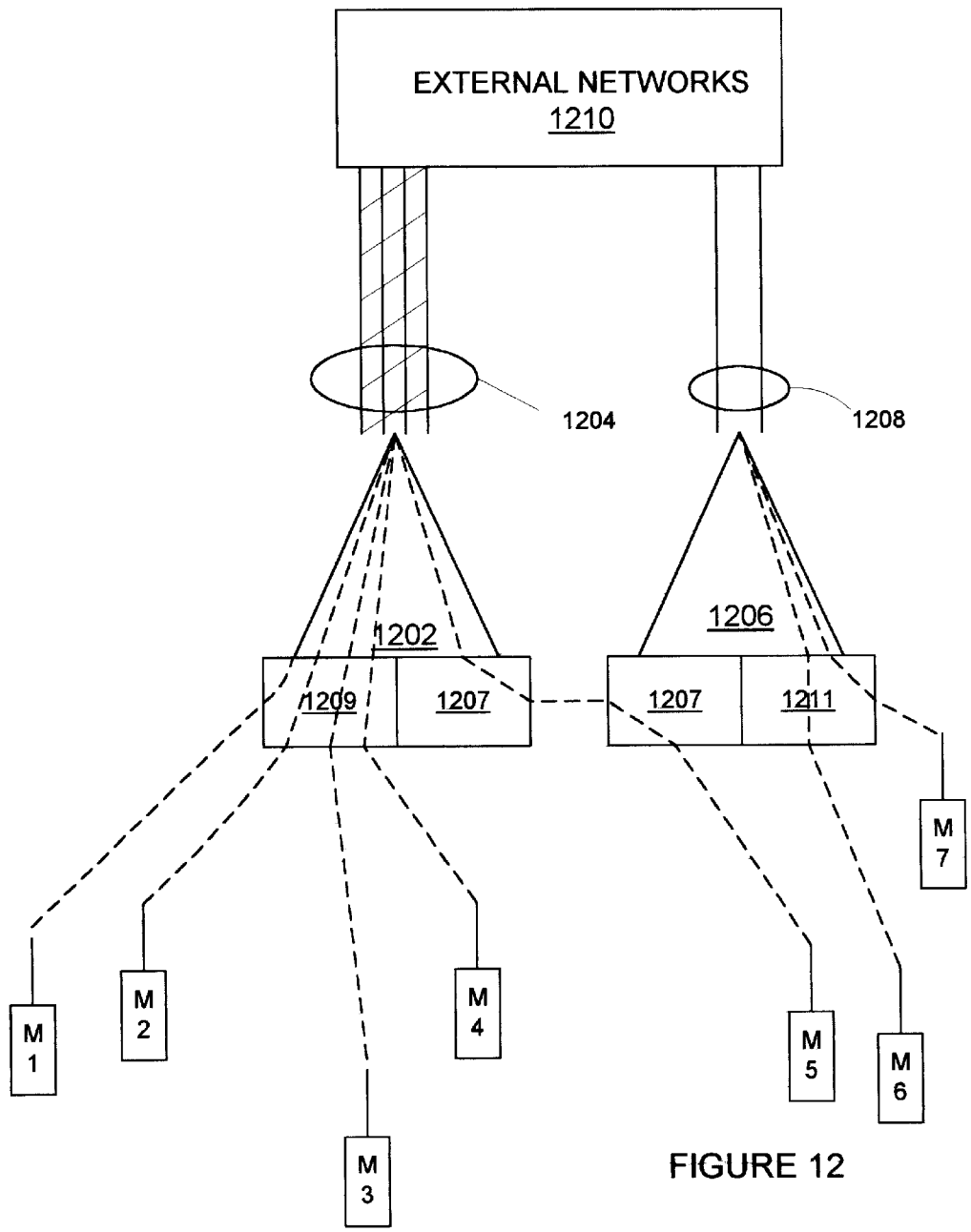
FIG. 12 is an illustration of a system in accordance with the present invention.

In another aspect of the invention, a single high-capacity line is shared among several base stations, as depicted in FIG. 12. In a system 1200, a first base station 1202 is connected to a high-capacity line 1204. A second base station 1206 is connected to the first base station by a dedicated network 1207 between them, and to two outside line 1208. However, base station 1206 also could function properly with no outside lines, depending entirely on the first base station's resources for outside lines. Lines 1204 and 1208 are both connected to external networks (e.g., PSTN) 1210. Net 1207 allows all clients M1–M7 to have access to the high-capacity lines. In this example, base station 1202 and base station 1206 handle most of their clients on networks 1209 and 1211, respectively. Base station 1202 routes communications from M1–M4 through network 1209 and then to a high-capacity line 1204.

When client demand for base station 1206 exceeds the capacity of Net 3, base station 1206 requests use of the high-capacity lines from base station 1202. As depicted in FIG. 12, subscriber unit M5 has sent a call initiation request to base station 1206. However, the capacity of base station 1206 is exceeded. Base station 1206 inquires whether base station 1202 has a high-capacity line available. If it does, the call goes through base station 1206 to network 1207, to base station 1202 and then through the high-capacity line 1204 to the external networks. Calls competing to use the high-capacity lines can be prioritized, with preferential access given to priority calls.

Figure 13:
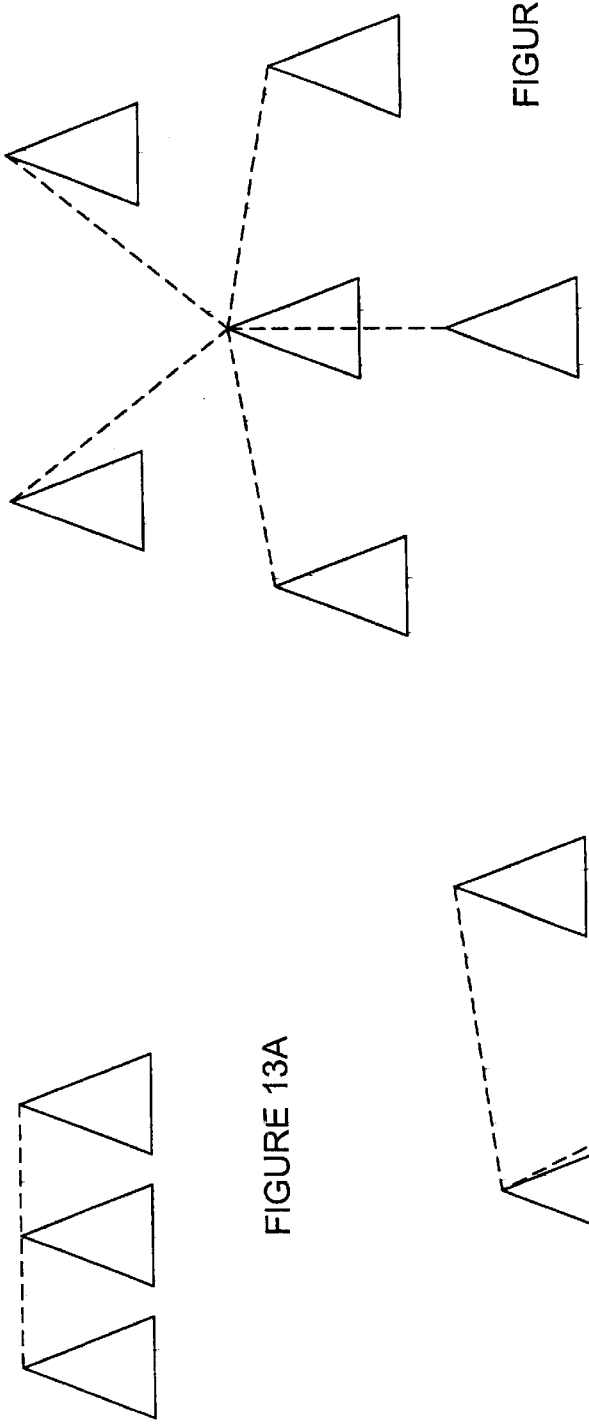
FIG. 13 is a depiction of exemplary topologies of networked base stations.

Dedicated networks between base stations can be combined in a variety of topologies, some examples of which are shown in FIG. 13. Base station connections can form a chain, as illustrated in FIG. 13A; a star, as depicted in FIG. 13B, or a combination, as illustrated in 13C. As those skilled in the art are aware, the invention is compatible with other topologies.

The dedicated networks can be defined by channel sequence, by code division, time division, frequency division, or hybrid techniques. Frequency hopping and direct sequencing techniques can also be used. In an example using time-division multiple access as applied to FIG. 12, Net 1 uses a first set of cyclically repeating time sequences. Net 2 uses a second set of cyclically repeating time sequences; and Net 3 uses a third set of cyclically repeating time sequences. The repeating sequences of Nets 2 and 3 are selected to minimize interference; the different nets cycle through the channels with controlled phase shifts. In code division systems, assigned sets of codes can define a dedicated network. Coordinated direct sequencing or frequency hopping systems may be used where the coordination assures non-interference of the different networks. For a simple example, Network 1 may use the base sequence or hopping algorithm. Network 2 uses the same sequence or hopping algorithm but advances (or retards) it by two channels. Each subsequent network advances or retards the channel sequence by 2 times its network number.

In a CDMA (Code Division Multiple Access) system many units share the same frequency spectrum Each signal is spread over a much wider frequency range using a unique code to determine how the energy is spread in frequency. On the receiving end the wide frequency range is monitored. A correlator uses the same code to regather the original signal energy and thus reconstruct the original signal. Many units can transmit simultaneously in this way. Each unit uses a unique code to spread its energy. The energy from the various signals overlap only in certain frequency ranges and so add only marginally to the noise of other signals. The receiving units are able to selectively filter out the energy of their intended signal and thus receive the proper signal without excessive interference from other transmitting units.

This CDMA technique may also be used in combination with time division techniques. So, for example, a base station may communicate with its handsets using a specific and unique code for spreading the energy. However, it may communicate with only one handset at a time, on a rotating basis. In whatever case, by using different and unique codes, different networks can be established allowing simultaneous multiple transmissions without undue interference.

Figure 14:
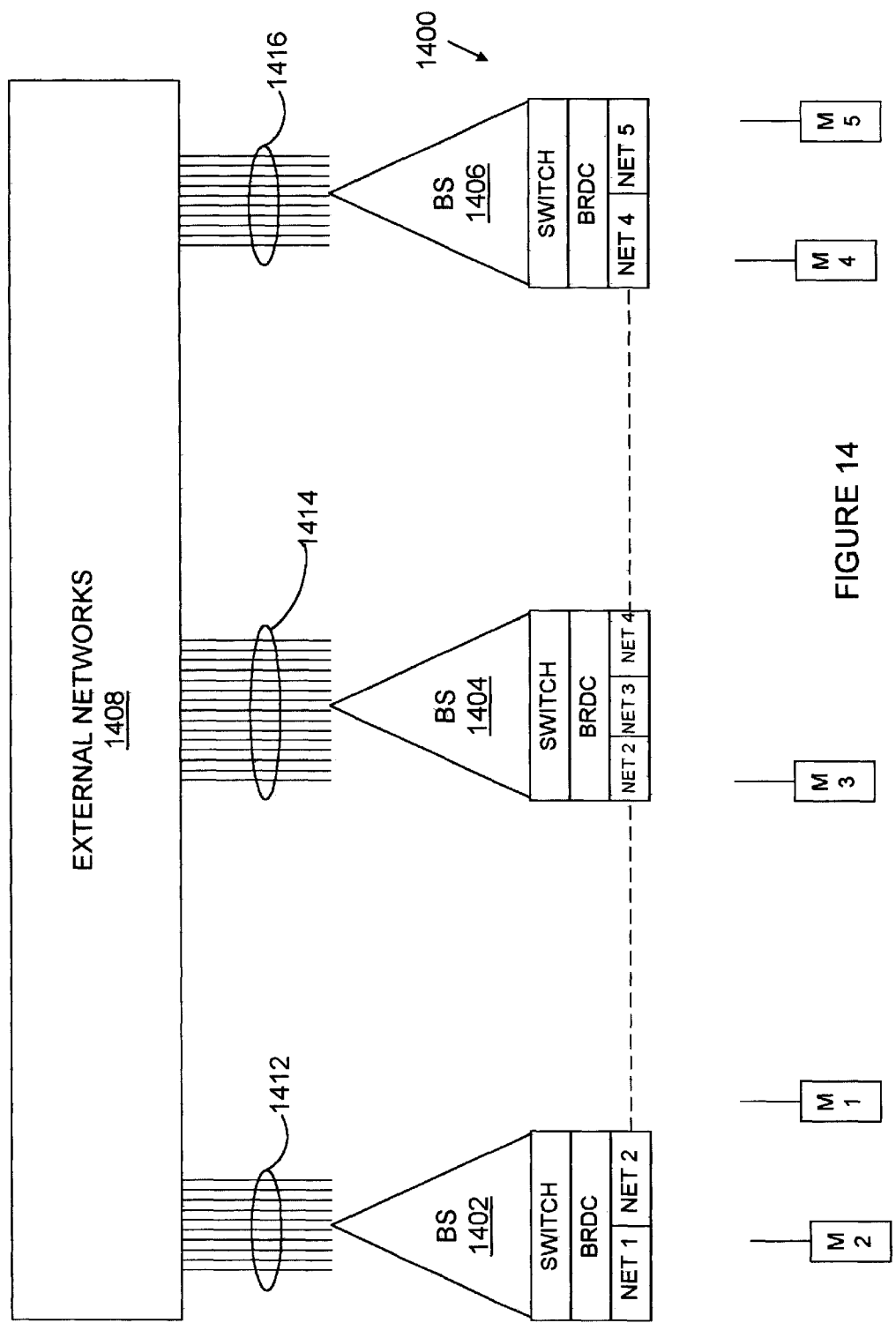
FIG. 14 is a depiction of networked base stations in accordance with the present invention.

The invention supports the dynamic reallocation of network connections to meet shifting demands. FIG. 14 is a simplified example to illustrate network replication. FIG. 14 shows a system 1400 including base stations 1402, 1404, and 1406. External networks 1408 connect to the base stations by links 1412, 1414, and 1416 respectively. In the example shown in FIG. 14, link 1412 includes ten outside lines, 1414 includes 15 fifteen outside lines, and 1416 includes ten outside lines. Base station 1404 is networked with base station 1402 and with base station 1406.

Each base station has networks established to organize the management of its communications. A network may be logical or physical. A logical network may be a portion of a sequential series of transmissions which are logically defined to facilitate communications management. A physical network is a signaling definition such as a cyclically repeating time sequence, which is arranged to be simultaneous but noninterfering with other networks. Thus all of the networks in a system are coordinated to allow non-interfering operation. Consider a time when base station 1402 is overloaded. For example, suppose twenty subscriber units initiate external calls through base station 1402. Assume at this time that base station 1402 and 1404 each have five external lines available, and base station 1406 has ten external lines available. Further assume that base stations 1402 and 1406 are too distant to communicate directly, but that each may communicate with base station 1404. The first five calls can use the five available lines connected to base station 1402. The second five calls can also go through base station 1402, using its network 2 to base station 1404 and its available external lines. The final ten calls go from base station 1402 to 1404, which in turn transfers them to 1406, which assigns them to its available lines. In this way, all calls are serviced even though no base station individually had sufficient resources, and two of the base stations are too distant to communicate directly.

In one implementation, each base station has cyclically repeating time sequences reserved for its own clients. Base station 1402 has sequences 1–5 reserved; base station 1404 has sequences 6–10 reserved; and base station 1406 has sequences 11–15 reserved. Sequences 16–35 are unassigned. Consider an occasion when base station 1402 is overloaded. For example, suppose twenty subscriber units initiate external calls through base station 1402. The first five calls can use reserved sequences 1–5. The second five calls can go through base station 1402, using unreserved sequences 16–20. The next ten calls can go through base station 1404, using unreserved sequences 21–30.

Now imagine that demand increases at base station 1404—ten of its clients place external calls. The first five can use the external lines at base station 1404. As two calls routed from base station 1402 end, two more requests are assigned to available sequences chosen from 21–30. The other three calls can be routed through networked base station 1406, using available sequences chosen from 21–30.

Base stations 1402 and 1406 sometimes access five each of 1404's outside lines using unreserved sequences. At other times, base station 1402 accesses ten of 1404's unreserved sequences and 1406 uses zero. In this way, using networked base stations and unassigned sequences, calls can be dynamically reassigned. A call can even be reassigned transparently while in progress.

Although the example in FIG. 14 shows sequences reserved for each base station, this is not a requirement of the system. All sequences can be unreserved, or fewer or more sequences can be reserved depending on system needs. The number of reserved sequences can change depending on statistical models or perceived demand. As has been discussed, networks can be defined by human action or automatically.

Although examples have been in terms of outgoing calls, the system and method are fully compatible with received calls. For example, consider a call coming into base station 1402 at a time when all its lines are busy. The base station can receive the incoming call if it comes in on a service that uses control channels. Because base station 1402 has no available lines, it queries base station 1404 through the dedicated network to ascertain whether base station 1404 has available lines. If the queried base station has available lines, base station 1404 can inform the calling switch to place the call through base station 1404. The use of an extra base station can be transparent to the caller if, for example base station 1402 and 1404 share a switch (not shown); or if a central office or PBX attached to 1402 and 1404 or to the calling phone is configured to redirect the call.

Alternative systems are compatible with the invention. Cellular phone systems, with mobile switching centers that are separate from the base stations, can be used. Specific configurations are generally unimportant—for example, whether a switch or other component is collocated or remote, or whether base stations share switches or central offices. Also, although in examples, the base station resource was preferred and direct networks an alternative, in another embodiment, formation of a direct network is preferred, and use of base resources is the second choice. Alternatively, the call allocation between direct networks and base station resources can be made according to predetermined or dynamic criteria.

"Wireless" in this document means communication without a physical connection. In all uses, "wireless" includes cordless, wireless, cellular, radio phones, pagers, infrared, optical and microwave, and other non-connected communication services. Devices using wireless services include facsimile devices, computers, and computer peripherals such as printers. "Lines" include wirelines and wireless and satellite links. Networks can be designated by different means than those enumerated. Other techniques can be used, for example, spread spectrum techniques, direct sequence multiple access, frequency hopped multiple access, space division multiple access, hybrid direct sequence/frequency hopped multiple access, hybrid time division/code division multiple access, hybrid time division frequency hopping, and packet radio.

Communication need not be voice communication, but can be audio or video data or arbitrary data as in file transfer, for example. Those skilled in the art will be aware of numerous variations within the spirit of the invention, the scope of which is limited only by the following claims.

What is claimed is:

1. In a wireless telecommunications network, a method of assigning calls to one of a direct network and a base-station-mediated network comprising the following steps:
    receiving a request to initiate a call from a first subscriber unit to a second subscriber unit;
    determining whether the quality of a signal between the first and second subscriber units meets a predetermined threshold;
    if the quality of the signal meets the threshold, directing the first and second subscriber units to communicate directly with each other,
    if the quality of the signal does not meet the threshold:
        mediating the communication between the first and second subscriber units through a resource external to the subscriber units;
        determining whether the quality of a signal between a third subscriber unit and a fourth subscriber unit, currently using the resource, meets the predetermined threshold; and
        if the quality of the signal between the third and fourth subscriber units meets the threshold, directing the third and fourth subscriber units to communicate directly with each other, thereby releasing the resource.

2. A wireless telecommunications network in accordance with claim 1 in which the subscriber units are any of a mobile telephone, cordless telephone, a cellular telephone, a wireless telephone, a pager, and a personal communications unit.

3. A wireless telecommunications network in accordance with claim 1 in which the subscriber units subscribe to different service providers.

4. A wireless telecommunications network in accordance with claim 1 in which the subscriber units subscribe to the same service provider.

5. A wireless telecommunications network in accordance with claim 1 in which the switch is included in a base station.

6. A wireless telecommunications network in accordance with claim 1 in which the switch is not included in the base station but is accessible to it.

7. In a wireless telecommunications network, a method of assigning calls to one of a direct network and a base-station-mediated network comprising the following steps:
    establishing a direct connection between a first subscriber unit and a second subscriber unit to initiate a communication between the first and second subscriber units;
    monitoring a communication between the first and second subscriber units to determine if a quality of a signal between the first and second subscriber units drops below a predetermined threshold during the communication, rerouting the communication through a resource;
    determining whether the quality of signal between a third subscriber unit and a fourth subscriber unit meets the predetermined threshold; and
    if the quality of signal between the third and fourth subscriber units meets the threshold, directing the third and fourth subscriber units to communicate directly, thereby releasing the resource.

8. The network of claim 7 wherein if the third and fourth units form a direct network, the communication between the first and second units is routed through the switch.

9. The network of claim 7 wherein the switch is external to the subscriber units but included in a base station.

10. A wireless telecommunications system, including a direct network and a base-station-mediated network, comprising:
    a switch operable to establish communications between a first wireless subscriber unit and a second wireless subscriber unit,
    a base station operable to receive a request to initiate a call from the first wireless subscriber unit to the second wireless subscriber unit, the first and second wireless subscriber units being controlled by the base station and operable to communicate directly with each other on a radio frequency channel, said direct communication not going through the base station or the switch; and
    monitoring means for determining the quality of a signal between wireless subscriber units controlled by a base station;
    if the quality of the signal between the first and second wireless subscriber units meets a predetermined threshold, the system operable to direct the first and second wireless subscriber units to communicate directly with one another;
    if the quality of signal between the first and second wireless subscriber units falls below the threshold, the system further operable to mediate the communication between the fist and second wireless subscriber units through the switch, and if a third and a fourth wireless subscriber unit controlled by the base station and using the switch to communicate have a quality of signal that meets the threshold, the system further operable to direct the third and fourth subscriber units to communicate directly with one another to enable a communication.

11. The system of claim 10 wherein the third telephone is a telephone controlled by an external telephone network.

12. The system of claim 10 wherein the third telephone is one of a personal communications device, wireless telephone, a mobile phone, a cordless phone, and a cellular phone.

13. The system of claim 11 wherein the external telephone network is one of the public switched telephone network, the integrated service digital network, the public land mobile network, and the public switched packet data network.

14. The system of claim 10 in which the subscriber units are any of a mobile telephone, cordless telephone, a cellular telephone, a wireless telephone, and a personal communications unit.

15. The system of claim 10 in which the subscriber units subscribe to different service providers.

16. A wireless telecommunications system in accordance with claim 22 in which the subscriber units subscribe to the same service provider.

17. The system of claim 10 in which the switch is included in the base station.

18. The system of claim 10 in which the switch is not included in the base station but is accessible to it.

19. The system of claim 10 in which the first and second subscriber units alternatively communicate through the base station.

20. The system of claim 19 in which the first and second subscriber units communicate through the base station and communicate directly during the same communication.

21. The system of claim 19 further including:

monitoring means for monitoring the quality of a signal between the first subscriber unit and the second subscriber unit, such that the communication between the first subscriber unit and the second subscriber unit changes from direct communication to alternative communication when the signal drops below a predetermined signal quality.

22. The system of claim 10 wherein if the third and fourth units form a direct network, the communication between the first and second units is routed through the switch.

\* \* \* \* \*